US012281500B2

(12) United States Patent
Lai

(10) Patent No.: US 12,281,500 B2
(45) Date of Patent: Apr. 22, 2025

(54) HIGH SECURITY COMBINATION PADLOCK AND LOCKING BAR WITH ADVANCED ANTI-PICKING MECHANISM

(71) Applicant: The Sun Lock Company Limited, Tuen Mun (HK)

(72) Inventor: Karl Lai, Tai Po (HK)

(73) Assignee: THE SUN LOCK COMPANY LIMITED, Tuen Mun (HK)

( * ) Notice: Subject to any disclaimer, the term of this patent is extended or adjusted under 35 U.S.C. 154(b) by 225 days.

(21) Appl. No.: 17/869,994

(22) Filed: Jul. 21, 2022

(65) Prior Publication Data

US 2023/0045238 A1 Feb. 9, 2023

Related U.S. Application Data

(60) Provisional application No. 63/230,230, filed on Aug. 6, 2021.

(51) Int. Cl.

*E05B 67/38* (2006.01)
*E05B 37/00* (2006.01)
*E05B 67/06* (2006.01)

(52) U.S. Cl.

CPC .......... *E05B 67/38* (2013.01); *E05B 37/0068* (2013.01); *E05B 67/06* (2013.01)

(58) Field of Classification Search

CPC ........ E05B 67/00; E05B 67/06; E05B 67/063; E05B 67/38; E05B 67/383; E05B 37/00;

(Continued)

(56) References Cited

U.S. PATENT DOCUMENTS 5,175,709 A 12/1992 Slayton et al.
6,029,481 A * 2/2000 Lai ........................ E05B 37/025 70/25

(Continued)

FOREIGN PATENT DOCUMENTS

CN 1438399 A 8/2003
CN 103243981 A 8/2013

(Continued)

OTHER PUBLICATIONS

International Search Report issued in corresponding international patent application PCT/CN2022/110159; dated Nov. 4, 2022.

*Primary Examiner* — Nathan Cumar
(74) *Attorney, Agent, or Firm* — Ware, Fressola, Maguire & Barber LLP

(57) ABSTRACT

A combination padlock comprising a body, true gates, a locking ball, a spindle and a plurality of clutches and dials, a shackle which contains a neck, a locking bolt with a neck, the spindle to control the lock opening of the locking bolt and control the alignment of the true gates of the clutches, the plurality of clutches to prevent the lock from being opened when the dials are not in a locked opened combination, the clutches having extended fins with rounded edges, and the plurality of dials to control the rotational movement of the clutches, so that when the extended fins of the clutches are fully aligned with the true gates, a user can pull a knob-side of the spindle to the right so that the neck of the shackle forces the locking-ball to move upward away from the neck of the shackle so as to unlock the padlock.

17 Claims, 13 Drawing Sheets

(58) Field of Classification Search
CPC .... E05B 37/0068; E05B 37/025; E05B 37/10; E05B 37/14; E05B 37/02; E05B 2067/066; E05B 2067/386
USPC ............................................................... 70/21
See application file for complete search history.

(56) References Cited

U.S. PATENT DOCUMENTS

| | | | | | |
|---|---|---|---|---|---|
| 6,035,672 | A * | 3/2000 | Lai | E05B 37/025 | 70/315 |
| 6,164,096 | A | 12/2000 | Lai | | |
| D439,824 | S | 4/2001 | Lai | | |
| D439,825 | S | 4/2001 | Lai | | |
| 6,408,660 | B1 | 6/2002 | Lai | | |
| 6,474,116 | B1 | 11/2002 | Lai | | |
| D472,790 | S | 4/2003 | Lai | | |
| 6,675,614 | B2 | 1/2004 | Lai | | |
| 6,729,166 | B1 | 5/2004 | Lai | | |
| 6,742,366 | B1 | 6/2004 | Lai | | |
| D498,132 | S | 11/2004 | Lai | | |
| 6,883,355 | B2 | 4/2005 | Lai | | |
| D511,673 | S | 11/2005 | Lai | | |
| 7,114,356 | B1 | 10/2006 | Yu | | |
| 7,117,698 | B2 | 10/2006 | Lai | | |
| 7,140,209 | B2 | 11/2006 | Lai | | |
| 7,225,648 | B2 | 6/2007 | Lai | | |
| 7,467,531 | B2 | 12/2008 | Lai et al. | | |
| 7,562,545 | B2 | 7/2009 | Lai et al. | | |
| 7,628,045 | B2 | 12/2009 | Yu | | |
| 7,685,851 | B2 | 3/2010 | Lai | | |
| 7,698,913 | B2 | 4/2010 | Lee | | |
| 7,765,840 | B2 | 8/2010 | Lai et al. | | |
| 8,056,376 | B2 | 11/2011 | Yu | | |
| 8,096,150 | B2 | 1/2012 | Lai et al. | | |
| 8,261,583 | B2 | 9/2012 | Lai et al. | | |
| 8,511,118 | B2 | 8/2013 | Lai et al. | | |
| 8,661,861 | B2 | 3/2014 | Lai | | |
| 8,776,556 | B2 | 7/2014 | Lai | | |
| 8,826,703 | B2 | 9/2014 | Lai | | |
| 8,919,155 | B2 | 12/2014 | Lai | | |
| 8,931,313 | B2 * | 1/2015 | Lai | E05B 37/025 | 70/284 |
| 9,206,625 | B2 | 12/2015 | Lai | | |
| 9,228,373 | B2 | 1/2016 | Huang | | |
| 9,228,376 | B2 | 1/2016 | Lai | | |
| 9,441,399 | B2 | 9/2016 | Yu | | |
| 9,464,460 | B2 | 10/2016 | Lai | | |
| 9,487,969 | B2 | 11/2016 | Lai | | |
| 9,556,650 | B1 | 1/2017 | Lai | | |
| 9,663,970 | B1 | 5/2017 | Yang | | |
| D789,174 | S | 6/2017 | Lai | | |
| 9,803,398 | B2 | 10/2017 | Lai | | |
| 9,890,559 | B2 | 2/2018 | Lai | | |
| 10,047,541 | B2 | 8/2018 | Lai | | |
| 10,214,942 | B2 | 2/2019 | Lai | | |
| 10,221,591 | B2 | 3/2019 | Lai | | |
| D864,695 | S | 10/2019 | Lai | | |
| 10,443,272 | B2 | 10/2019 | Lai | | |
| D902,691 | S | 11/2020 | Lai | | |
| 10,890,013 | B2 | 1/2021 | Lai | | |
| D914,481 | S | 3/2021 | Lai | | |
| 11,199,025 | B2 | 12/2021 | Lai | | |
| 11,261,622 | B2 | 3/2022 | Lai | | |
| 11,346,127 | B2 | 5/2022 | Lai | | |
| 2003/0150245 | A1 * | 8/2003 | Lai | E05B 37/025 | 70/25 |
| 2008/0307834 | A1 * | 12/2008 | Ma | E05B 37/0034 | 70/38 R |
| 2009/0031764 | A1 * | 2/2009 | Huang | E05B 37/0034 | 70/21 |
| 2014/0338407 | A1 | 11/2014 | Zhang | | |
| 2020/0190855 | A1 | 6/2020 | Lai et al. | | |
| 2021/0189766 | A1 | 6/2021 | Lai | | |
| 2022/0065001 | A1 | 3/2022 | Lai | | |

FOREIGN PATENT DOCUMENTS

| | | | | | |
|---|---|---|---|---|---|
| CN | 104213778 | A | | 12/2014 | |
| CN | 105840009 | A | | 8/2016 | |
| CN | 206468121 | U | | 9/2017 | |
| CN | 112443203 | A | | 3/2021 | |
| EP | 1529907 | B1 | | 12/2012 | |
| GB | 2577281 | A | * | 3/2020 | E05B 35/105 |
| GB | 2577281 | B | | 9/2020 | |

* cited by examiner

HIGH SECURITY COMBINATION PADLOCK AND LOCKING BAR WITH ADVANCED ANTI-PICKING MECHANISM

CROSS-REFERENCE TO RELATED APPLICATION

This application claims benefit to U.S. Provisional Application No. 63/230,230 filed Aug. 6, 2021, which application is incorporated by reference in its entirety.

TECHNICAL FIELD

The present invention relates to improvements to combination padlocks.

BACKGROUND OF THE INVENTION

The present invention is a combination padlock with an advanced anti-picking mechanism which is enclosed in a locking body/housing. Prior art U.S. Pat. No. 6,883,355 has three extended fins on the clutches with three true gates on the lock body. However, the effectiveness is very limited from a lock picking perspective since there are only five of ten chances to locate the true opening position which can quite easily be picked and opened. The present invention is directed to improvements in anti-picking mechanisms.

SUMMARY OF THE INVENTION

The present invention incorporates an improved fault gate mechanism which allows seven faulty gates and three true gates (or a number of extended fins on the clutches as true gates and the remaining being faulty gates). Such a feature causes a lock picker to have the "clicking" sound generated in every number which can confuse the picker from locating the true gate. This makes the combination mechanism harder to pick. The new padlock also incorporates another feature in the extended fin on the clutches which is a round edge (could be chamfer) such that when the extended fin is on the faulty gates, the round edge will contact the edge of the faulty gates and true gate and allow them to keep rotating. It allows the picker to still rotate the dial without stopping the extended fin from rotating the clutches such that the picker cannot use his/her tactile feelings to judge the exact location of the true gate in the locked mode. Such a feature also makes it harder for the lock picker to locate which number or letter is part of the correct code.

DETAILED DESCRIPTION

Figure 1A:
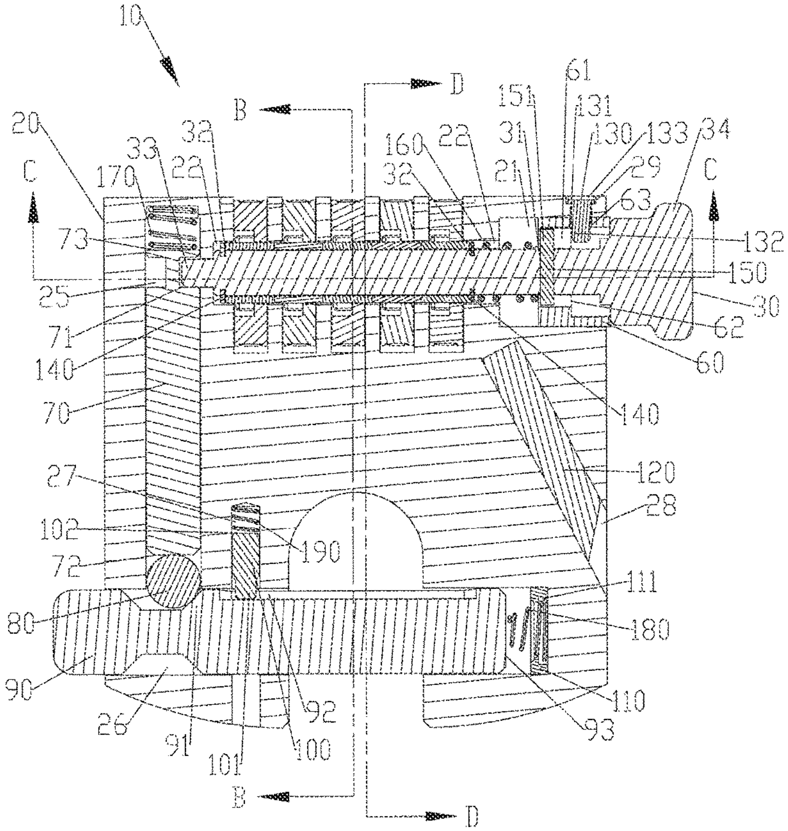
FIG. 1A is a cross-sectional view of the combination padlock according to one embodiment of the present invention.
Figure 1B:
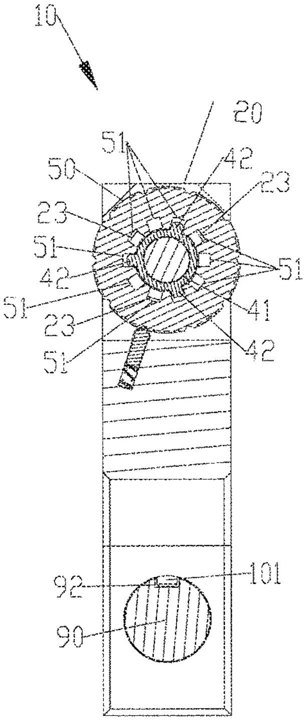
FIG. 1B is a cross-sectional view of the padlock taken along line B-B of FIG. 1A.
Figure 1C:
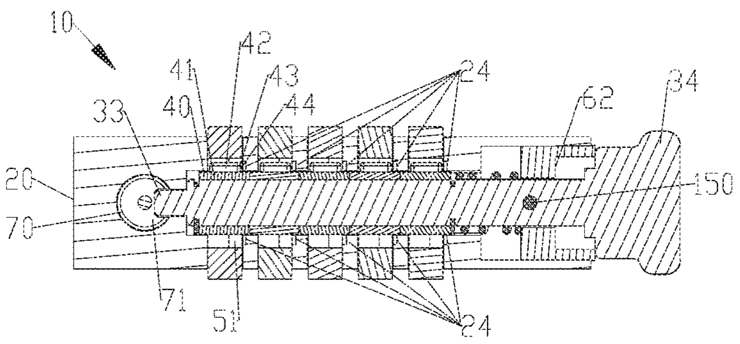
FIG. 1C is a cross-sectional view of the padlock taken along line C-C of FIG. 1A.
Figure 1D:
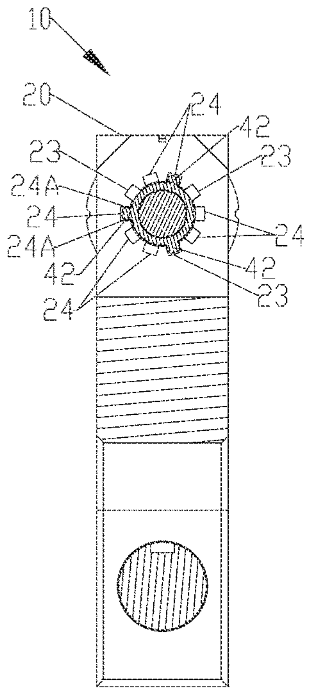
FIG. 1D is a cross-sectional view of the padlock taken along line D-D of FIG. 1A.
Figure 2:
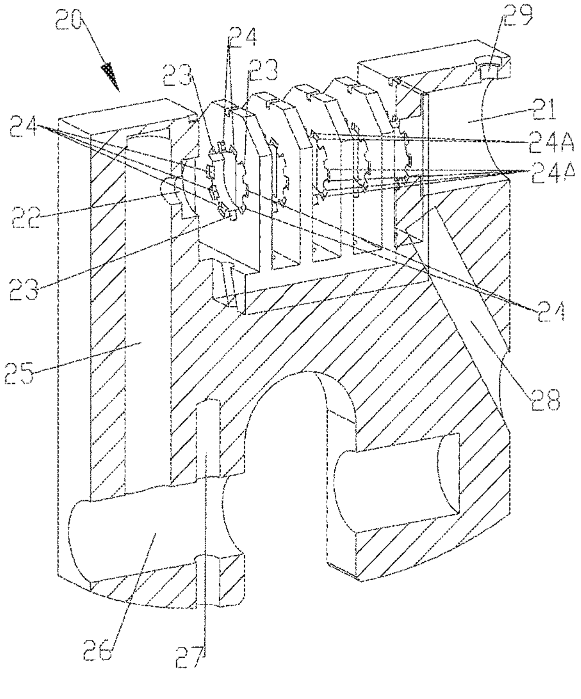
FIG. 2 is a perspective view of the padlock where the padlock is shown in cross-section.
Figure 3:
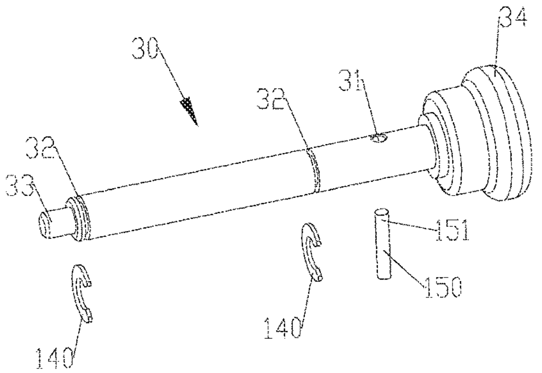
FIG. 3 is a perspective view of the spindle and associated parts.
Figure 4:
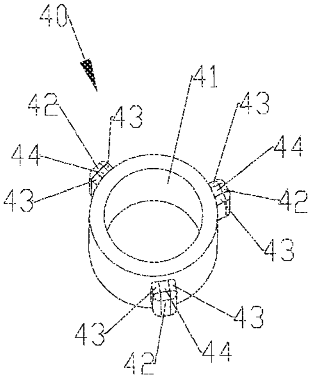
FIG. 4 is a perspective view of one of the clutches of the padlock.
Figure 5:
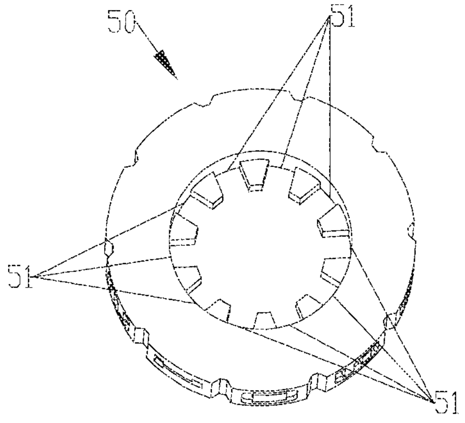
FIG. 5 is a perspective view of one of the dials of the padlock.
Figure 6:
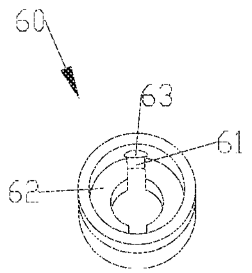
FIG. 6 is perspective view of a control-plug forming part of the padlock.
Figure 7:
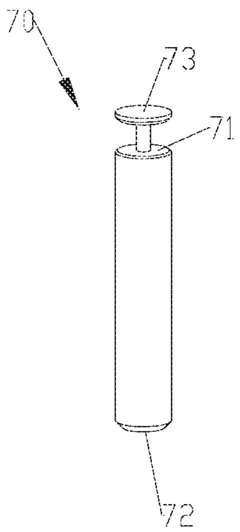
FIG. 7 is perspective view of a bolt forming part of the padlock.
Figure 8:
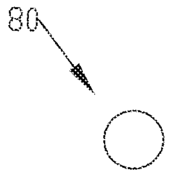
FIG. 8 is a perspective view of a locking-ball forming part of the padlock.
Figure 9:
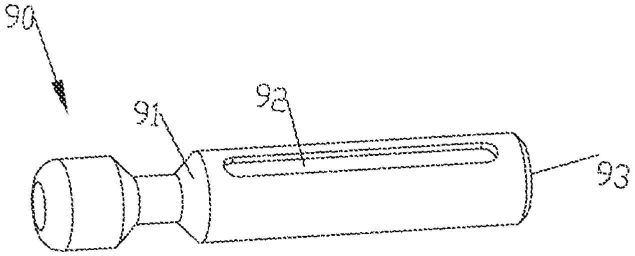
FIG. 9 is a perspective view of a shackle forming a part of the padlock.
Figure 10:
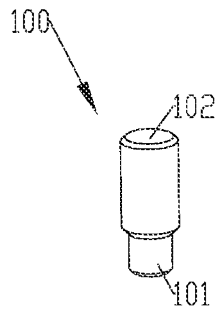
FIG. 10 is a perspective view of a shackle-retain-peg forming a part of the padlock.
Figure 11:
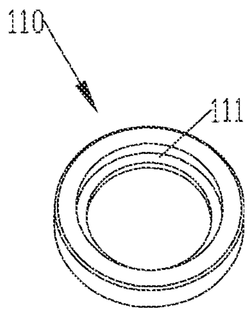
FIG. 11 is a perspective view of a shackle-spring-guard forming a part of the padlock.
Figure 12:
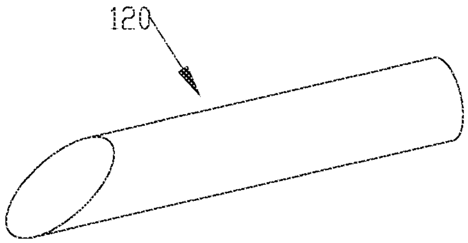
FIG. 12 is a perspective view of an anti-drilling-rod forming a part of the padlock.
Figure 13:
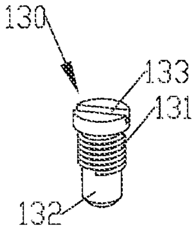
FIG. 13 is a perspective view of a reset-screw forming a part of the padlock.
Figure 14A:
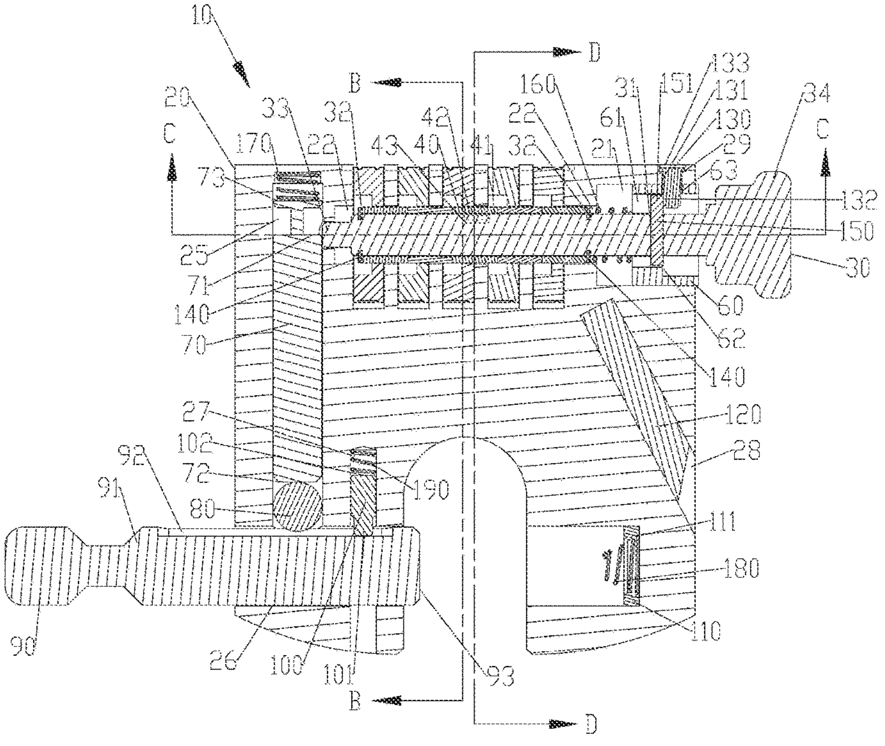
FIG. 14A is a cross-sectional view of the padlock illustrating its operation in the unlock by combination mode.
Figure 14B:
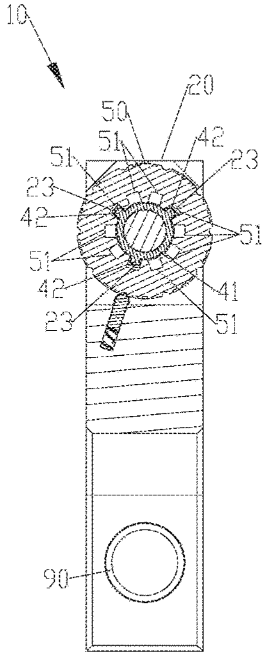
FIG. 14B is a cross-sectional view of the padlock taken along line B-B of FIG. 14A.
Figure 14C:
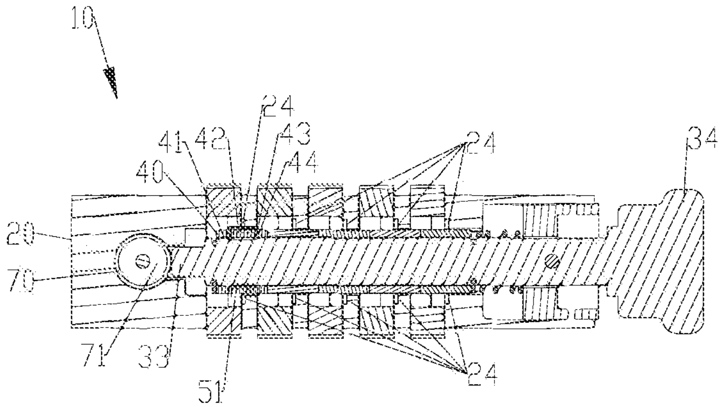
FIG. 14C is a cross-sectional view of the padlock taken along line C-C of FIG. 14A.
Figure 14D:
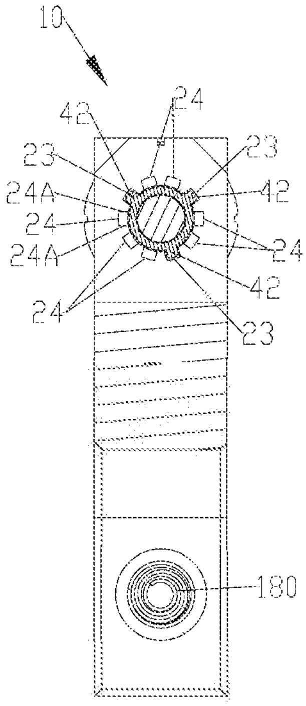
FIG. 14D is a cross-sectional view of the padlock taken along line D-D of FIG. 14A.
Figure 15A:
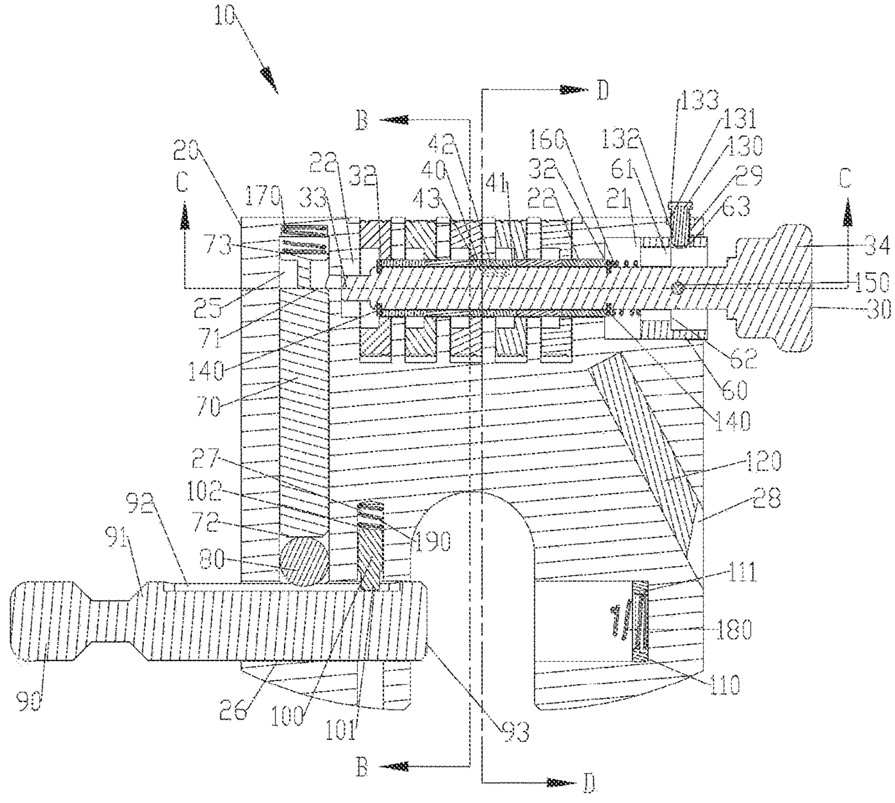
FIG. 15A is a cross-sectional view of the padlock illustrating its operation in the resent mode.
Figure 15B:
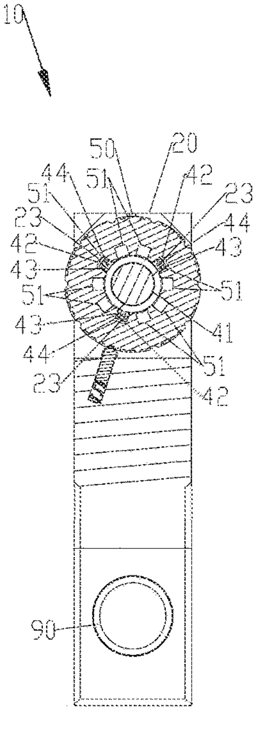
FIG. 15B is a cross-sectional view of the padlock taken along line B-B of FIG. 15A.
Figure 15D:
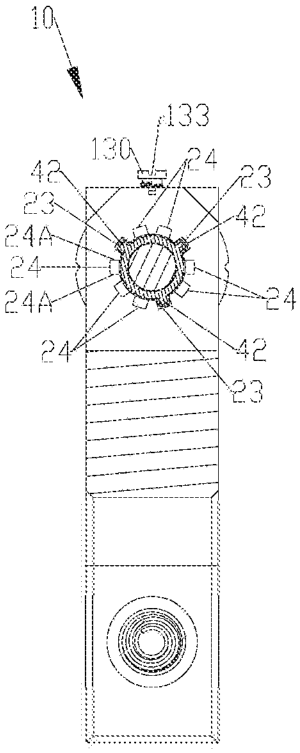
FIG. 15D is a cross-sectional view of the padlock taken along line D-D of FIG. 15A.
Figure 15C:
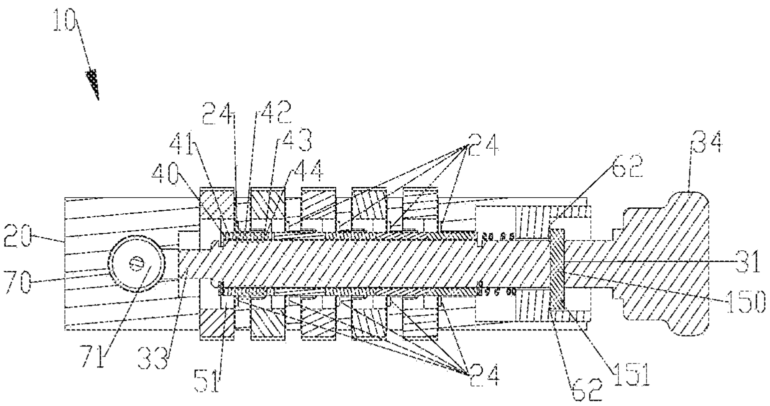
FIG. 15C is a cross-sectional view of the padlock taken along line C-C of FIG. 15A.

The part numbering for this application is presented below:

10 Combination Padlock.

20 Body. 21 Control-plug holes. 22 Spindle hole. 23 True gates. 23A True gate edge. 24 Faulty gates. 24A Faulty gates edges. 25 Bolt-hole. 26 Shackle Hole. 27 Retain Peg Hole. 28 Anti-Drill Hole. 29 Reset Screw hole.

30 Spindle. 31 Peg Hole. 32 C-Clip slots. 33 Tail. 34 Knob-side.

40 Clutch. 41 Clutch hole. 42 Extended-Fin. 43 Round Slope Edge. 44 Flat Spot.

50 Dial. 51 Teeth.

60 Control-Plug. 61*a* Long peg-hole. 61*b* Short peg hole. 62 Reset Surface. 63 Reset Screw hole.

70 Bolt. 71 Neck. 72 Front-Surface. 73 Tail Side

80 Locking-Ball.

90 Shackle. 91 Neck. 92 Slot. 93 Tail

100 Shackle-retain pegs. 101 Tip. 102 Tail.

110 Shackle-Spring-Guard. 111 Spring-Contact Side.

120 Anti-Drilling-Rod.

130 Reset-Screw. 131 Thread. 132 Stop-Edges.

140 C-Clip

150 Peg. 151 Long-side Peg.

160 Spindle Spring.

170 Bolt Spring

180 Shackle Spring

190 Shackle-Retain-Peg Spring

Second Embodiment of the Clutch:

400 Clutch-with-slope

410 Clutch Hole

420 Extended Fin

430 Slope with Edge

440 Flat Spot

Locked Mode (FIGS. 1A-13):

The lock 10 contains a shackle 90 wherein the shackle 90 controls by the combination mechanism. When the lock is in the locked mode, the shackle 90 has no horizontal movement (relative to the lock body 20), wherein the shackle 90 remains in the shackle-hole 26 as the combination dials are not in the correct combination code. The locking-ball 80 engages in neck 91 of the shackle 90. The ball is also in contact with the front-surface 72 of bolt 70. The bolt 70 has a neck 71 which is engaged with the tail 33 of the spindle 30. The bolt spring 170 pushes the tail side 73 of the bolt 70 downward such that the front-surface 73 of the bolt 70 pushes the locking-ball 80. This arrangement causes the locking-ball 80 to always be in contact with the neck 91 of the shackle 90 to let the shackle remain in the locked position.

The tail 93 of the shackle 90 has a shackle spring 180 in contact therewith. The shackle spring 180 is assembled with a shackle-spring-guard 130. Some portion of the shackle is trapped in the spring-contact side 111 and all of these parts are pressed fitted in the end of shackle hole 26.

The spindle 30 contains two C-clip slots 32 to assemble the Control-plug 60, Spindle-Spring 160, and clutches 40 inside the spindle and the clutch holes 41 of the clutches 40 pass through the spindle 30 and then two C-clips 140 are positioned to hold these parts in the spindle. The control-plug 60 is press fitted to the control-plug-hole 21 of the lock body such that the sandwiched position is permanently affixed to the combination padlock 10. The spindle also contains a peg hole 31 to receive the press fitted peg 150. The peg contains a long-side 151 which makes the spindle configured to the upside and downside. If the length of the peg is the same in each side, then there is no ability to differentiate the rotational direction during the reset mode as will be described below. The peg 150 is placed inside of the long peg-hole 61*a* and the short peg hole 61*b* of the control-plug 60 during the locked mode. A reset screw 130 contains a thread 131 and is placed through the reset screw hole 29 of the lock body 20 and reset screw hole 63 of the control-plug 60.

If at least one dial 50 is not in the lock open combination, then it will not allow the lock to open. The teeth 51 of the dials 50 engage with the extended-fins 42 of the clutches 40. In such a position, the rotation of each dial 50 will be directly transferred to the corresponding clutch 40.

Meanwhile, the lock body 20 contains a series of faulty gates 24, wherein the faulty gates are deep enough to get the flat spot 44 of extended-fin 42 of the clutch 40 to contact the faulty gate 24 of the lock body 20. Each of the extended-fins 42 includes a pair of substantially parallel sides and the flat spot 44 is positioned at one end of the extended-fin 42. Also, each clutch 40 contains a round slope edge 43, connecting flat spot 44 with the substantially parallel sides, which will be in contact with faulty gates edge 24A which will let the round slope edge 43 of the clutch to slide away from the faulty gates 24 as the lock picker turns the dials 50 while pulling knob-side 34 of the spindle 30 to pick the lock. Each of the faulty gates 24 has a depth less than a distance between a connection between the round slope edge 43 and the pair of substantially parallel sides and a connection between the round slope edge 43 and the flat spot 44. Even if one or two extended-fins 42 of the clutches 40 align with the true-gate 23 of the lock body, and at least one of the extended-fins 42 is aligned with the false gate 24, the lock still cannot be opened. Also, the round slope edge 43 can slide away from the true-gate edge 23*a* and faulty gates edge 24*a* as at least one extended fin 42 of the clutch 40 is not aligned to the true-gate 23.

The set of faulty gates 24 of the lock body 20 are not only deep enough to catch the flat side 44 of the clutch 40, but also are able to let the round slope edge 43 to slide away from the faulty gate 24 of the lock body.

The padlock 10 also contains an anti-drilling rod 120 which is placed inside of the anti-drilling hole 28 to stop an attack by drilling the lock.

The shackle 90 contains a slot 92 which receives the Shackle-retain peg 100 which is located in the retain peg hole 27 of the lock body 20. The shackle-retain-peg spring 190 will always contact the tail 102, which always pushes the tip 101 toward the slot 92 of the shackle 90. In this assembly position, the shackle 90 can only move horizontally within the slot 92. Hence once it is assembled, the shackle 90 can move to the open and close positions but cannot completely detach from the combination padlock 10.

Thus, a main feature of the embodiment shown in FIGS. 1A-15D is that the lock body 20 contains a set of faulty-gates 24 to catch the extended-fin 42 of the clutch 40. This makes the lock very hard to pick as there are 7 faulty-gates 24 and 3 extended-fins 42. The extended-fins 42 must align with the three opening slots 23 to let the clutches 40 move around the lock. The number of faulty gates 24 and extended fins 42 can be modified.

Unlock by Combination (FIGS. 14A-14D):

In the unlocked by combination mode, the fins 42 of the clutches 40 are fully aligned with the true-gates 23 of the lock body 20. This means that there is nothing to block the fins 42 of the clutches 40 from moving horizontally (rightward) to the open position. As the extended fins 42 move rightward to the true-gates 23 and fully engaged to the true gates 23, a portion of the extended-fins 42 still engages with the teeth 51 of the dials 50. This prevents the clutches 40 and dials 50 from being rotated when in the open mode. It is a very good feature such that the user cannot accidentally change of combination.

As described, due to the sandwiched position of the spindle 30, the user can pull the knob-side 34 of the spindle 30 rightward, so that the spindle moves to the right. The spindle will move to the right until the long-side peg 151 of the peg 150 contacts the stop-edges 132 of the reset screw 130. As the spindle moves rightward, the tail 33 of the spindle 30 will move away from the neck 71 of the bolt 70. At this moment, the shackle spring 180 will exert a force leftward such that the neck 91 of the shackle will force the locking-ball 80 to move upward (toward the dials 50) away from the neck 91 of the shackle 90. The shackle 90 continues to move leftward until the tip 101 of the shackle-retain peg 100 contacts the other end of the slot 92 of the shackle 90.

To relock the lock, the user can push the shackle to the locked position such that the locking ball 80 will engage back to the neck 91 of the shackle 90. At this moment the bolt-spring 170 will force the bolt 70 downward pushing the front-surface 72 and the locking ball 80 toward the neck 91 area to fully engage the locking ball 80 and the neck 91 of the shackle 90. Also, the neck 71 of the bolt 70 will now realign with the tail 33 of the spindle 30 to move leftward such that the tail 33 will engage back to the neck 71. The spindle spring 170 is assembled in between the C-clip 140 and the control-plug 60. The control-plug 60 does not contain any movement throughout any mode as it is press fitted into the control-plug-hole 21. Also, a reset screw 130 is placed through the lock body and the control-plug and threaded through holes 29/63 of the lock body/control plug 20/60. As the control plug remains silent, the spindle spring 170 will exert a force and push the C-clips 140 leftward which makes the spindle move leftward. Hence, the alignment of the neck 71 of the bolt 70 and the tail 33 of the spindle 30 causes the spindle to move leftward allowing the engagement of the two parts.

Also, in relock, the extended-fins 42 of the clutches 40 will disengage away from the true gates 23 of the lock body 20 and the extended-fins 42 still engage with teeth 51 of the dial 50. Therefore, as the user scrambles the dials 50 then it will rotate the clutches 40 in the same manner. As the dials are being scrambled, then the extended-fins 42 will no longer align to the true gates 23 of the lock body 20. Thus, the user cannot pull the spindle knob 34 to open the lock. The lock is now back to the locked mode.

Reset Mode (FIGS. 15A-15D):

In the reset mode, the user must open the lock via unlock by combination mode by aligning all the extended-fins 42 of the clutches 40 to the true gates 23 of the lock body 20. Then, the user needs to unwind the reset-screw 130 away from the lock unit 10 such that the stop-edges 132 will not block the long-side 151 of the peg 150. Since nothing blocks the peg, the assembled-spindle 30 can further move rightward such that the extended-fins 42 of the clutches 40 will disengage away from the teeth 51 of the dials 50 so that the extended-fins 42 are fully engaged in the true-gate 23 of the lock body 20. The rotational movement of the dials 50 will not rotate the clutches 40. The user can keep pulling rightward until the peg passes the reset surface 62 of the control-plug 60. Then the user can turn the knob 34 of the spindle such that the long-side peg 151 can rest on the reset surface 62 of the control plug. The user can use both hands to turn the dials 50 to set a new code.

After setting the new code, the user can rotate the knob such that the long-side peg 151 aligns with the long-peg-hole 61*a* of the control-plug 60. Then the spindle spring 160 will exert a force to push the assembled-spindle 30 leftward toward the bolt 70 such that the long side peg 151 will engage back to the long-peg hole 61*a* and the extended-fin 42 will engage back with the teeth 51 of the dial 50. The user can place the reset screw 130 back to the reset screw hole 29/63 of the lock body 20 and control-plug 60. In this way the user cannot further pull the assembled-spindle further rightward to change the code as the stop-edges 132 of the reset screw 130 will block the long-side peg 151 of the peg 150.

Second-Embodiment of the Clutch (FIG. 16):

This embodiment has a clutch 400 with a slope to demonstrate that the round edge can also be in the form of a slope edge.

Figure 16:
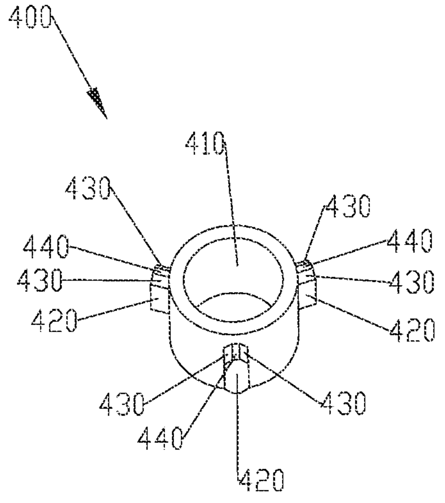
FIG. 16 is a perspective view of a second embodiment of a clutch used in a second embodiment of the present invention.

FIG. 16 shows that this second embodiment has a Second Embodiment clutch-with-slope 400, a Second Embodiment Clutch Hole 410, Second Embodiment Extended-Fins 420, a Second Embodiment Slope Edge 430, and a Second Embodiment Flat Spot 440.

The second embodiment of FIG. 16 thus contains a clutch-with-slope 400 wherein the clutch hole 410 is exactly the same as 41, extended-fin 420 is exactly the same as 42, the flat spot 440 is exactly the same as 44. The extended-fin 420 includes a pair of substantially parallel sides with the flat spot 440 positioned at one end of the extended-fin 420. The only difference between the clutch-with-slope 400 and clutch 40 is that the second embodiment slope edge 430 is as configured in FIG. 16 (a smooth slope edge), and the clutch 40 contains a rounded-slope-edge 43. The main feature of the slope-edge 430 is to smoothly and swiftly slide the extended-fin 420 away from the faulty-gates 24 and the true gates 23 when the intruder tries to pick the lock. The faulty-gates 24 have a depth less than a distance between a connection between the slope-edge 430 and the pair of substantially parallel sides and the connection with the slope-edge 430 and the flat spot 440. This would be similar to the round slope edge 43 which is also to smoothly and swiftly slide the extended-fin 42 away from the faulty-gates 24 and the true gates 23 when the intruder tries to pick the lock.

Thus, the Second Embodiment Clutch 400 contains an important part which is the second embodiment slope 430. In the locked mode, if a lock picker pulls the knob 34 rightward then the second embodiment flat spot 440 will contact the faulty gates 24. This stops clutch 400 from rotating which yields the dial stop rotation and performs the "clicking sound". If the lock picker further turns the dials 50, then the second embodiment clutch 400 turns in the same manner in the locked mode so that the second embodiment slope 430 will contact the faulty gates edges 24A and then the clutch 400 will rotate again without seizing in rotation to make it difficult for the lock picker to feel the true gates. This is an important feature of the application.

What is claimed is:

1. A combination padlock, comprising:

a body, a plurality of clutches and a plurality of dials, wherein each clutch of the plurality of clutches has a corresponding dial of the plurality of dials configured to control rotational movement of each corresponding clutch, at least one true gate formed in the body for each clutch of the plurality of clutches, and at least one faulty gate formed in the body for each clutch of the plurality of clutches, at least one extended fin for each clutch of the plurality of clutches, wherein a number of the at least one true gate for each clutch is the same as the number of each one extended fin for each clutch, a locking ball, a spindle and a shackle having a shackle neck configured to receive the locking-ball, and a locking bolt having a locking bolt neck and configured for operative engagement with the spindle to control movement of the locking bolt, wherein each extended fin of the at least one extended fin comprises a pair of substantially parallel sides, a flat spot at one end of the extended fin and at least one slope edge connecting the flat spot with the pair of substantially parallel sides, and wherein each of the at least one faulty gate has a depth less than a distance between a connection between the at least one slope edge and the pair of substantially parallel sides and a connection between the at least one slope edge and the flat spot.

2. The combination padlock according to claim 1, wherein the at least one slope edge of each of the at least one extended fin for each clutch is a smooth slope edge to allow each of the at least one extended fin to slide away from the corresponding faulty gate to protect against lock picking.

3. The combination padlock according to claim 2, wherein when the flat spot contacts one of the corresponding at least on faulty gates the faulty gate stops the clutch from rotating so that the smooth slope-edge smoothly allows the extended-fin to slide away from the faulty gates and the true gates.

4. The combination padlock according to claim 1, wherein the at least one true gate forms a passage through the body for the corresponding at least one extended fin for each clutch, and the at least one faulty gate does not form a passage through the body for the corresponding at least one extended fin for each clutch.

5. The combination padlock according to claim 1, wherein each dial of the plurality dials contain a plurality of teeth to engage the at least one extended fin of each corresponding clutch.

6. The combination padlock according to claim 1, wherein each clutch of the plurality of clutches comprises a clutch hole to allow insertion of the spindle through each clutch, and the combination padlock further comprises a pair of C-Clips configured to retain the plurality of clutches on the spindle so as to form an assembled spindle in which movement of the plurality of clutches is controlled by movement of the spindle.

7. The combination padlock according to claim 6, wherein the assembled spindle controls the movement of the locking bolt and locking ball to further control the movement of the shackle between a lock open state in an unlocked by combination mode and a locked mode state in a locked mode.

8. The combination padlock according to claim 7, wherein the shackle neck is configured to receive the locking ball when the combination padlock is in the locked mode and the locking bolt is configured to retain the locking ball in the shackle neck in the locked mode.

9. The combination padlock according to claim 1, wherein when at least one of the lock open combination digits is not selected for at least one of the dials of the plurality of dials each of the clutches corresponding to the at least one of the dials not having the lock open combination digit selected prevents the combination padlock from being operated from a locked mode to an unlocked by combination mode, and wherein in the locked mode of the combination padlock rectilinear movement of the spindle within the body away from the locking bolt neck of the locking bolt is prevented.

10. The combination padlock according to claim 9, wherein the spindle comprises a tail configured for engagement with the locking bolt neck in the locked mode of the combination padlock, wherein the combination padlock further comprises a shackle spring configured to urge the shackle in a direction substantially perpendicular to the movement of the locking bolt within the body and substantially parallel to the movement of the spindle within the body, and wherein when all of the at least one extended fins for each clutch of the plurality of clutches are fully aligned with the true gates, the spindle is configured for operation so that the tail of the spindle moves away from the locking bolt neck of the locking bolt so that the shackle spring urges movement the shackle so that the shackle neck moves the locking-ball away from the shackle neck so as to operate the combination padlock into the unlocked by combination mode.

11. The combination padlock according to claim 9, wherein the spindle comprises a tail configured for engagement with the locking bolt neck in the locked mode of the combination padlock, wherein when all of the at least one extended fins for each clutch of the plurality of clutches are fully aligned with the true gates, the spindle is configured for operation so that the tail of the spindle moves away from the locking bolt neck of the locking bolt, wherein the shackle neck is configured to urge the locking ball away from the shackle when the tail of the spindle moves away from the locking bolt neck of the locking bolt, and wherein when the locking ball is disengaged from the shackle neck the combination padlock may be operated into the unlocked by combination mode.

12. The combination padlock according to claim 1, wherein the at least one slope edge for each of the at least one extended fin for each clutch are rounded slope edges.

13. The combination padlock according to claim 12, wherein the at least on faulty gates formed in the body are configured to allow the at least one extended fin of each clutch to contact at least one round edge of the extended fins and forceably slide away from the faulty gates when contacting edges of the faulty gates.

14. The combination padlock according to claim 13, wherein there is a flat spot on the at least one extended fin of each clutch so that when the flat spot contacts one of the corresponding at least one faulty gates the flat spot with the faulty gate of the corresponding at least one faulty gates to cause a clicking sound.

15. The combination padlock according to claim 13, wherein the extended fin round edge allows the extended fin to slide away from the faulty gate to protect against lock picking.

16. The combination padlock according to claim 1, wherein each dial of the plurality of dials has a plurality of digits thereon, and a lock open combination is comprised of one lock open combination digit on each dial, wherein when the lock open combination digit is selected for each dial of the plurality of dials, the at least one extended fin for the corresponding clutch is aligned with the corresponding at least one true gate, and wherein a number of the at least one faulty gate for each clutch of the plurality of clutches is a number of the plurality of digits on each dial less the number of the at least one true gate for each clutch.

17. The combination padlock according to claim 16, wherein the plurality of digits on each dial is equal to ten, and the at least one extended fin for each clutch is equal to three, and the at least one faulty gate for each clutch is equal to seven.

* * * * *